United States Patent
Tang et al.

(10) Patent No.: US 12,545,791 B2
(45) Date of Patent: Feb. 10, 2026

(54) CHROMATE-FREE AND PHOSPHATE-FREE CERAMIC COATING COMPOSITIONS FOR HOT CORROSION PROTECTION OF SUBSTRATES

(71) Applicants: Zhihong Tang, Carmel, IN (US); Daryl G. Copeland, Indianapolis, IN (US); Mark W. Perpall, Indianapolis, IN (US)

(72) Inventors: Zhihong Tang, Carmel, IN (US); Daryl G. Copeland, Indianapolis, IN (US); Mark W. Perpall, Indianapolis, IN (US)

(73) Assignee: PRAXAIR S.T. TECHNOLOGY, INC., North Haven, CT (US)

( * ) Notice: Subject to any disclaimer, the term of this patent is extended or adjusted under 35 U.S.C. 154(b) by 247 days.

(21) Appl. No.: 18/456,860

(22) Filed: Aug. 28, 2023

(65) Prior Publication Data
US 2024/0067833 A1 Feb. 29, 2024

Related U.S. Application Data

(60) Provisional application No. 63/402,129, filed on Aug. 30, 2022.

(51) Int. Cl.
| | |
|---|---|
| *C23C 14/08* | (2006.01) |
| *C09D 1/02* | (2006.01) |
| *C09D 5/10* | (2006.01) |
| *C09D 5/18* | (2006.01) |
| *C09D 7/40* | (2018.01) |
| *C09D 7/61* | (2018.01) |
| *C23C 24/10* | (2006.01) |

(52) U.S. Cl.
CPC .............. *C09D 5/103* (2013.01); *C09D 1/02* (2013.01); *C09D 5/18* (2013.01); *C09D 7/61* (2018.01); *C09D 7/68* (2018.01); *C09D 7/69* (2018.01); *C23C 14/08* (2013.01); *C23C 24/103* (2013.01)

(58) Field of Classification Search
CPC .......... C23C 14/08; C23C 24/103; C09D 1/02
See application file for complete search history.

(56) References Cited

U.S. PATENT DOCUMENTS

| | | |
|---|---|---|
| 5,795,659 A | 8/1998 | Meelu et al. |
| 6,126,758 A | 10/2000 | Meelu et al. |
| 6,435,830 B1 | 8/2002 | Allen et al. |
| 7,314,674 B2 | 1/2008 | Hazel et al. |
| 7,754,342 B2 | 7/2010 | Hazel et al. |
| 9,194,242 B2 * | 11/2015 | Lee .................. F01D 5/288 |

(Continued)

FOREIGN PATENT DOCUMENTS

| | | | | |
|---|---|---|---|---|
| CA | 2479060 A1 | * | 9/2003 | |
| CA | 2479060 C | * | 5/2011 | ............. C23C 22/66 |

(Continued)

OTHER PUBLICATIONS

Translation of KR 100435422 B1 (Year: 2004).*

*Primary Examiner* — Hoa (Holly) Le

(57) ABSTRACT

Novel multilayer aqueous slurries and coatings for hot corrosion protection of substrates are provided that exhibit improved resistance to type II hot corrosion while also being hexavalent chromium free. The compositions represent a notable departure and performance improvement from conventional coating systems utilized for hot corrosion protection.

14 Claims, 1 Drawing Sheet

DTA result of a silicate binder of the present invention, after drying in oven at 80°C and then used for DTA measurement.

(56) References Cited

U.S. PATENT DOCUMENTS

| | | | |
|---|---|---|---|
| 9,777,583 B2 | 10/2017 | Leggett | |
| 12,252,628 B2 * | 3/2025 | Belov | ............... C23C 28/04 |
| 2020/0123070 A1 | 4/2020 | Belov et al. | |
| 2023/0348733 A1 * | 11/2023 | McMordie | ............. C09D 5/084 |

FOREIGN PATENT DOCUMENTS

| | | | | |
|---|---|---|---|---|
| CA | 2829517 A1 | * | 5/2014 | ............... B05D 1/00 |
| EP | 1793015 A2 | | 6/2007 | |
| EP | 1798311 A2 | | 6/2007 | |
| KR | 100435422 B1 | * | 6/2004 | ................ C09D 7/69 |
| WO | WO-2004033116 A1 | * | 4/2004 | ............. C04B 41/85 |
| WO | 2016148967 A1 | | 9/2016 | |
| WO | 2022125224 A1 | | 6/2022 | |

\* cited by examiner

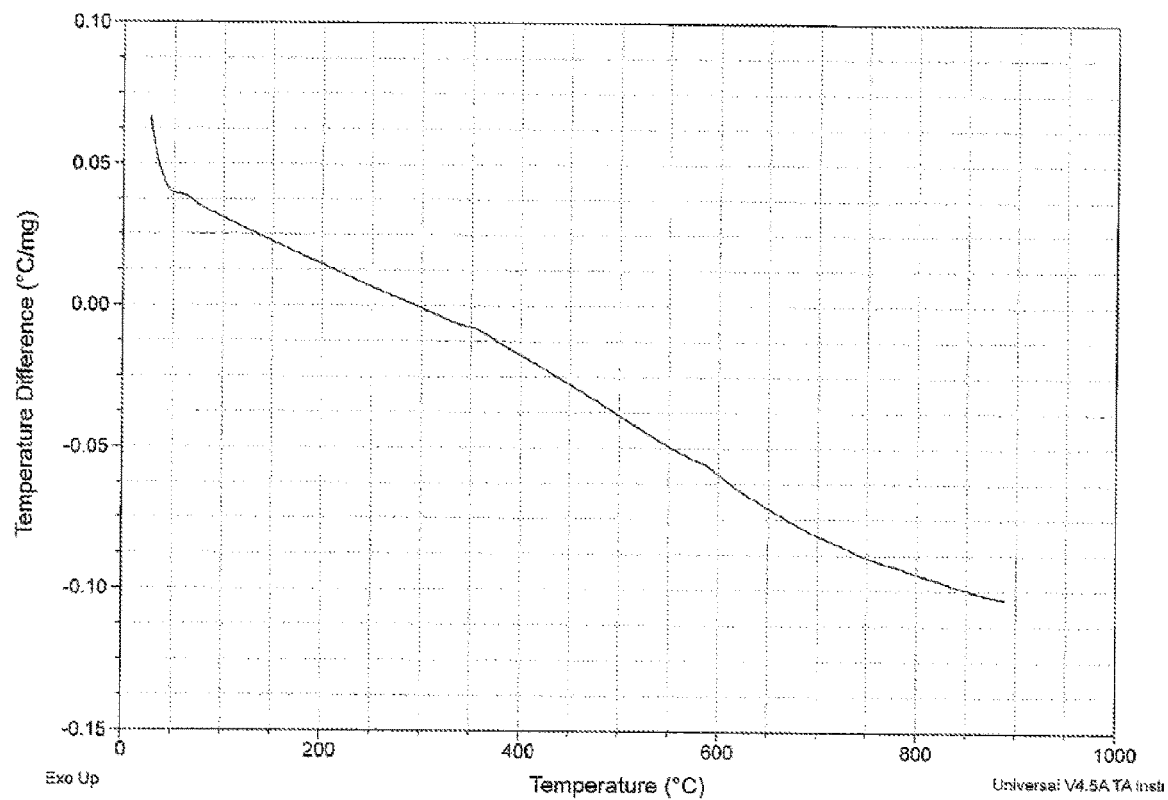
DTA result of a silicate binder of the present invention, after drying in oven at 80°C and then used for DTA measurement.

CHROMATE-FREE AND PHOSPHATE-FREE CERAMIC COATING COMPOSITIONS FOR HOT CORROSION PROTECTION OF SUBSTRATES

RELATED APPLICATIONS

This application claims the benefit of priority from U.S. Serial Application No. 63/402,129, filed on Aug. 30, 2022, which is incorporated herein by reference in its entirety.

FIELD OF THE INVENTION

The invention relates to novel multilayer slurries and coatings that result in improved type II hot corrosion protection on various substrates, including disk alloys.

BACKGROUND OF THE INVENTION

The surfaces of gas-turbine engine components during operation can become damaged due to their exposure to hot gases and corrosive environments. Turbine engine components are generally made of a nickel-based (Ni-based) or cobalt-based (Co-based) superalloy as a result of their high-temperature mechanical properties and corrosion resistance. Higher operating temperatures in gas-turbine engines are required to increase fuel efficiency and reduce emissions. In response to these design objectives, superalloy compositions of the gas-turbine engine components have been improved to increase their mechanical properties. Specifically, the content of refractory elements has been increased and the content of chromium (Cr) has been reduced. However, such modifications have made the gas-turbine engine components more susceptible to environmental attack in the hot gases and the corrosive environment.

Turbine disks are a critical component of the gas-turbine engine. Turbine disks typically account for 20% of the total weight of the gas-turbine engine. The primary function of the turbine disks is to provide fixturing for the turbine blades. The complete assembly of the disks and blades is then capable of transmitting power to fan and compressor sections. The turbine disk alloys typically exhibit adequate high-temperature creep and fatigue properties. Consequently, the turbine disk alloys have historically remained uncoated and, in such uncoated state, have been capable of imparting sufficient environmental resistance due to lower operating temperatures.

The ever-increasing need for higher fuel efficiencies and engine operating temperatures have led to the development of new disk alloys with the capability to operate at 1300° F. or potentially higher. However, a drawback of operating at 1300° F. or potentially higher is that that new disk alloy materials become susceptible to type II hot corrosion regimes (to be explained hereinbelow), and consequently require a protective coating to protect against the onset, reduction or elimination of type II hot corrosion attack. "Hot corrosion" as used herein and throughout is defined as the accelerated corrosion attack induced by molten sulfate salts that can deposit directly onto metallic components. Such molten sulfate salts can be ingested with the inlet air in marine environments or form as a result of a combustion process. Hot corrosion attack can cause catastrophic failure of the superalloy component by either high material loss or reduction in fatigue life by corrosion-initiated fatigue cracking. Depending on the temperature, hot corrosion can be classified as two types. The first type of hot corrosion is called high-temperature type I hot corrosion, which is typically observed in the temperature range from about 1500° F. to about 1750° F., and most aggressively at about 1650° F. The other type is known as low-temperature type II hot corrosion which occurs at a temperature range of about 1100° F. to about 1400° F., and most aggressive at about 1300° F.

Metallic coatings have been widely used in turbine components for type I and type II hot corrosion protection as discussed in the patent literature. Such metallic coatings are either a chromide coating; platinum or silicon-modified aluminide coating; or MCrAlY overlay coatings (where M is Ni, Co, or a combination of Ni and Co). By way of example, U.S. Pat. No. 6,435,830 discloses a MCrAlY overlay coating for corrosion protection onto an under-platform area of the turbine blade; U.S. Pat. No. 9,777,583 discloses a platinum plus chromium coating applied to roots and firtrees of a turbine blade for type II hot corrosion protection; and U.S. Pat. No. 6,126,758 discloses a slurry-based silicon-modified aluminide coating for improved hot corrosion resistance. Although each of these metallic coatings has adequate resistance to both type I and type II hot corrosion attack, these coatings have drawbacks. The metallic coatings cannot be applied onto the disk alloy for two reasons. First, the metallic coatings mentioned above are typically processed at a temperature above about 1500° F. or requires a post-coat heat treatment above about 1500° F. Such a high coating process temperature is not allowed on the disk alloy, as it will significantly change the microstructure and properties of the disk alloy. A coating process with process temperature below about 1100° F. to about 1400° F. is typically required for the disk alloy. Second, during engine operation, an interdiffusion zone will be formed between the metallic coatings and the disk alloy and significantly reduce the fatigue life of the disk alloys. Hence, an overlay coating system without interdiffusion with disk alloy is required.

To address these deficiencies, various overlay coating systems and processes with lower process temperatures have been reported in the patent literature to protect the disk alloy from type II hot corrosion attack. For example, U.S. Pat. No. 7,754,342 discloses a composition that includes a carrier liquid, a silicone binder, and corrosion-resistant particles selected from the group consisting of refractory particles and non-refractory particles. The corrosion-resistant particles provide the coating with the key corrosion resistance, while the silicone-based material is the binder during application and forms the matrix after curing. Upon curing, the silicone-based binder forms a glassy silicate matrix, which upon firing, may convert at least partially to a glassy ceramic matrix. As a result, such a silicone-based binder and resultant glassy silicate matrix produced after curing are not thermally stable at operating temperatures, and may further convert into other glassy ceramic matrix phases. Such phase transformation is typically accompanied by volume change of the matrix phase, which deteriorates adhesion and binding properties of the glassy ceramic matrix. Although the lower process temperature is desirable, the use of silicone binder and thermal stability of the glass ceramic matrix in the corrosion-resistant coating disclosed in U.S. Pat. No. 7,754,342 is problematic in its performance for long-term type II hot corrosion protection.

U.S. Pat. No. 7,314,674 discloses a corrosion resistant composition that comprises a glassy-forming phosphate-containing binder component and a particulate corrosion resistant component. The "glass-forming binder component" comprises an inorganic compound or composition that, when cured, forms an amorphous, glassy matrix to which the particulates in the particulate component are embedded in, are encapsulated in, are enclosed by, or otherwise adhered to. Binder components suitable for use in U.S. Pat. No. 7,314,674 typically comprise a phosphate binder, with or without other binder materials. The phosphate ceramic matrix does not have sufficient corrosion-resistance when the operating environments are highly corrosive.

Given the drawbacks described hereinabove, there continues to be a need for improved protective overlay coatings resistant to type II hot corrosion on various substrates, including disk alloys.

SUMMARY OF THE INVENTION

In a first aspect of the present invention, an aqueous slurry composition for the production of a multilayer coating system for hot corrosion protection of a substrate comprising: a basecoat slurry, comprising: a first binder comprising a first silicate-based aqueous solution, wherein said first binder is substantially free of chromate, phosphate, sodium, and potassium; and metal oxide particles incorporated into said first binder, said metal oxide particles comprising at least one of alumina, chromia, zirconia, zirconia-containing complex oxides, ceria and rare earth oxides; metallic particles incorporated into said first binder, said metallic particles comprising MCr or MCrAlY, where M is Ni or Co, or a combination of Ni and Co; a topcoat slurry, comprising: a second binder comprising a second silicate-based aqueous solution, wherein said second binder is substantially free of chromate, phosphate, sodium, and potassium.

In a second aspect of the present invention, a multilayer coating system for hot corrosion protection of a substrate, comprising: a substrate; a basecoat, said basecoat comprising: a first ceramic matrix characterized as comprising a first silicate-based matrix, wherein said first silicate-based matrix is substantially free of chromate, phosphate, sodium, and potassium; metal oxide particles incorporated into said first ceramic matrix, said metal oxide particles comprising at least one of alumina, chromia, zirconia, zirconia-containing complex oxides, ceria and rare earth oxides; metallic particles incorporated into said first ceramic matrix, said metallic particles comprising MCr or MCrAlY, where M is Ni or Co, or a combination of Ni and Co; a topcoat, said topcoat comprising: a second ceramic matrix characterized as comprising a second silicate-based matrix, wherein said second silicate-based matrix is substantially free of chromate, phosphate, sodium, and potassium.

The invention may include any of the aspects in various combinations and embodiments to be disclosed herein.

BRIEF DESCRIPTION OF THE DRAWINGS

FIG. 1 show a differential thermal analysis of a silicate binder used in the present invention.

DETAILED DESCRIPTION OF THE INVENTION

The advantages of the invention will be better understood from the following detailed description of the embodiments thereof in connection. The disclosure is set out herein in various embodiments and with reference to various features, aspects and embodiments of the invention. The principles and features of this invention may be employed in various and numerous embodiments in various permutations and combinations without departing from the scope of the invention. The disclosure may further be specified as comprising, consisting or consisting essentially of, any of such permutations and combinations of these specific features, aspects, and embodiments, or a selected one or ones thereof.

The term "about" is meant to represent the inherent degree of uncertainty that may be attributed to any quantitative comparison, value, measurement or other representation. The term "about" is also used to represent the degree which a quantitative representation may vary from a stated reference without resulting in a change in the basic function of the subject matter at issue.

"Substantially-free" means no greater than trace impurities of the species being referenced. By way of non-limiting example, "substantially-free of chromate" means no greater than trace impurities of chromate; "substantially-free of phosphate" means no greater than trace impurities of phosphate; "substantially-free of sodium" means no greater than trace impurities of sodium; and "substantially-free of potassium" means no greater than trace impurities of potassium.

Various aspects of the present invention may be presented in range format. Where a range of values describes a parameter, all sub-ranges, point values and endpoints within that range or defining a range are explicitly disclosed therein, unless explicitly disclosed otherwise. All physical property, dimension, concentration and ratio ranges and sub-ranges between range end points for those physical properties, dimensions, concentrations and ratios are considered explicitly disclosed herein, unless explicitly disclosed otherwise. For example, description of a range such as from 1 to 10 shall be considered to have specifically disclosed sub-ranges such as from 1 to 7, from 2 to 9, from 7 to 10 and so on, as well as individual numbers within that range such as 1, 5.3 and 9.

"Zirconia-containing complex oxides" means at least one oxide of an yttria-modified zirconia, titania-modified zirconia, magnesia-modified zirconia, zirconia-toughened alumina, rare-earth zirconate.

"Substrate" includes, but is not limited to, disk alloys and other gas-turbine engine components that may be exposed to type II hot corrosion attack.

"Conventional coating systems" means coating systems disclosed in the Background of the Invention.

The present invention relates in one aspect to an aqueous slurry composition to produce a multilayer overlay coating system with special properties. Compositions of binder materials and a specific synergistic combination of the binder materials and pigment have been found to favorably affect the morphology and microstructure of the coating, resulting in coated substrates that exhibit superior functional properties in comparison to conventional coating systems, such as those disclosed in the Background of the Invention.

The aqueous slurry composition comprises a basecoat slurry. The basecoat slurry comprises a binder that is a silicate-based aqueous binder solution. The binder is substantially free of chromate, phosphate, sodium, and potassium. As a silicate-based aqueous solution, the binder of the basecoat slurry excludes silicone-containing materials and amorphous silica-containing materials, both of which impart deleterious properties to the present invention. Silicone is a polymer made up of siloxane (—R2Si—O—SiR2-, where R=organic group), and is only thermally stable up to 500° F. with an undesired phase transformation occurring during curing and at operating temperatures of 1100-1400° F. For example, U.S. Pat. No. 7,754,342 discloses a silicone-containing material binder that upon curing forms an undesirable glassy silicate matrix, which upon firing, may convert at least partially to an undesirable glassy ceramic matrix. Additionally, amorphous silica-containing materials are also not an ideal candidate for the binder solution of the present invention due to its thermal instability. In this regard, US Patent Pub. No. 2007/0128447 disclosed a corrosion resistant coating comprising a silica-based matrix, which glassifies around the ceramic particles on curing, and at elevated temperatures of operation converts to a glassy ceramic. Such gasification during elevated temperature operation causes a volume change of the coating and therefore deteriorates the binding properties and adhesion of the corrosion-resistance coating. Silicone-containing materials and amorphous silica-containing materials are only partially stable during thermal exposure and therefore the associated phase transformation deteriorate their binding properties. Contrary to silicone-containing materials and amorphous silica-containing materials utilized by the aforementioned prior art, the present invention represents a notable departure from such trend and utilizes a thermally stable and corrosion-resistant silicate-based binder matrix to maintain the integrity and adhesion of the corrosion-resistant coating during long-term operation at a temperature range of about 1100° F. to about 1400° F.

Silicate is a compound in which the anion contains both silicon and oxygen, typically represented with the general formula $SiO_{4-x}^{(4-2x)-}$ where $0<x<2$; the subscript 4-x designates the number of oxygen atoms; and the superscript (4-2x)- designates the negative charge for the silicate anion. Advantageously, the silicate based aqueous binder solution, upon drying and curing, is thermally stable at temperatures up to about 1600° F. As shown in FIG. 1, the silicate binder of the present invention, after drying at 80° C., is stable and has no phase transformation once heated to 900° C. (i.e., 1650° F.) based on differential thermal analysis (DTA). Unlike the prior art silicone-containing materials and amorphous silica-containing materials, there is no formation of volatile product or phase transformation with silicate that can cause detrimental volume expansion and deteriorate the binding properties of the binder.

The ceramic matrix, formed by curing the silicate-based aqueous binder solution, has sufficient corrosion resistance to type II molten-sulfate induced hot corrosion attack in a temperature range of about 1100° F. to about 1400° F. To be effective, the silicate-based aqueous binder solution of the present invention is required to be substantially free of phosphate, sodium, and potassium. The presence of phosphate, sodium, or potassium in the ceramic binder matrix of the overlay coating systems is believed to reduce its corrosion resistance to molten sulfate attack in the temperature range from about 1100° F. to about 1400° F. Additionally, the silicate-based aqueous binder solution of the present invention is substantially free of chromate. Because both of the silicate-based binders in the basecoat and topcoat slurry, respectively, do not contain chromate, the aqueous slurry composition and resultant overlay coating systems are environmentally safe materials.

The metal oxide particles are incorporated into the silicate-based binder of the basecoat slurry. The metal oxide particles comprise at least one of alumina, chromia, zirconia, zirconia-containing complex oxides, ceria and rare earth oxides.

Additionally, metallic particles are incorporated into the silicate-based binder of the basecoat slurry. The metallic particles comprise MCr or MCrAlY, where M is Ni or Co, or a combination of Ni and Co.

The aqueous slurry composition further comprises a topcoat slurry. The topcoat slurry includes a silicate-based aqueous solution. The silicate-based aqueous solution of the topcoat slurry has the same features as those of the basecoat slurry, including being substantially free of chromate, phosphate, sodium, and potassium. However, unlike the basecoat slurry, the silicate-based binder in the topcoat slurry is preferably pigment free, and devoid of any metal oxides and metallic particles.

Preferably, the silicate-based aqueous binder in both the basecoat slurry and the topcoat slurry is a basic solution and has a PH from about 9 to about 13. Such a high PH is preferred for relatively high adhesion and binding properties. In one embodiment, the silicate-based aqueous binder is a lithium silicate solution. Other suitable silicate-based materials are also contemplated by the present invention.

Various particle size distributions are contemplated for the metallic particles. In one embodiment, the metallic particles comprise a particle size distribution characterized with a $50^{th}$ percentile of the particle size distribution that has a diameter of between about 5 microns to about 8 microns and a $90^{th}$ percentile of the particle size distribution that has a diameter of less than about 12 microns to about 16 microns.

Various particle size distributions are contemplated for the metallic oxide particles. In one embodiment, the metal oxide particles comprise a particle size distribution characterized with a $50^{th}$ percentile of the particle size distribution that has a diameter of between about 0.4 microns to about 4 microns and a $90^{th}$ percentile of the particle size distribution that has a diameter of less than about 6 microns to about 8 microns.

In a preferred embodiment, the metallic particles comprise a particle size distribution characterized with a $50^{th}$ percentile of the particle size distribution that has a diameter of between about 5 microns to about 8 microns and a $90^{th}$ percentile of the particle size distribution that has a diameter of less than about 12 microns to about 16 microns, in combination with the metal oxide particles comprising a particle size distribution characterized with a $50^{th}$ percentile of the particle size distribution with a diameter of between about 0.4 microns to about 4 microns and a $90^{th}$ percentile of the particle size distribution with a diameter of less than about 6 microns to about 8 microns.

Upon drying and curing at a temperature of up to about 800° F. the multilayer aqueous slurry composition of the present invention, the silicate-based binder forms a silicate ceramic matrix phase, which is thermally stable up to about 1600° F. without volatile phase formation and without phase transformation. Once cured, the silicate ceramic matrix is also chemically resistant to molten-sulfate induced hot corrosion attack at a temperature range of 1100-1400° F.

By curing the silicate-based aqueous binder solutions of the basecoat and topcoat slurries, respectively, a resultant ceramic matrix corresponding to the basecoat and topcoat is formed to produce a multilayer coating system. The multilayer coating system is suitable for hot corrosion protection of a substrate. The basecoat includes a first ceramic matrix characterized as a first silicate-based matrix, which is substantially free of chromate, phosphate, sodium, and potassium. Metal oxide particles are incorporated into the first ceramic matrix. The metal oxide particles comprise at least one of alumina, chromia, zirconia, zirconia-containing complex oxides, ceria and rare earth oxides. Additionally, metallic particles are incorporated into the first ceramic matrix. The metallic particles comprise MCr or MCrAlY, where M is Ni or Co, or a combination of Ni and Co.

The topcoat comprises a second ceramic matrix characterized as a second silicate-based matrix, wherein said second silicate-based matrix is substantially free of chromate, phosphate, sodium, and potassium. The second silicate-based matrix is preferably pigment free, thereby not containing any metal oxide particles or metallic particles.

Similar particle size distribution for the metallic particles and metal oxide particles as present in the multilayer slurry occur in the multilayer coating system.

In a preferred embodiment, the coating multilayer system includes a lithium silicate-based matrix for the basecoat and another lithium silicate-based matrix for the topcoat.

The multilayer coating system of the present invention has sufficient corrosion resistance to molten-sulfate induced type II hot corrosion attack at temperature range of about 1100° F. to about 1400° F. To be effective, the silicate-based aqueous binder solution of present invention is substantially free of phosphate, sodium, and potassium, thereby making the multilayer coating's type II corrosion resistance superior to those of conventional coating systems. The presence of phosphate, sodium, or potassium in the ceramic binder matrix of overlay coating systems is believed to reduce its type II corrosion resistance to molten sulfate attack at the temperature range from about 1100° F. to about 1400° F.

The multilayer coating system can be used as a corrosion protective coating for any substrate susceptible to type II corrosion attach, including, but not limited to a superalloy substrate. In a preferred embodiment, the superalloy substrate is a disk alloy that is coated with the overlay multilayer coating system of the present invention. The overlay multilayer coating for type II hot corrosion protection on disk alloys can exhibit favorable performance, as defined by (i) a substantial absence of interdiffusion of the coating system with the disk alloy during high-temperature operation up to 1400° F., thereby leading to a substantial absence of fatigue debit on the disk alloy; (ii) the coating exhibiting resistance to molten surface induced type II hot corrosion at temperatures of about 1100F to about 1400F; (iii) no detrimental effect on the mechanical properties of disk alloy as a result of the coating process temperature below about 1100F to about 1400F; and (iv) all components in the coating thermally stable with no phase transformation, and therefore maintaining coating integrity and adhesion to the disk alloy substrate during thermal cycling that can occur in operation.

While the embodiments hereinabove have described the present invention as a corrosion-resistance coating for rotating turbine discs, it should be understood that the present invention has other applications. By way of a non-limiting example, the present invention can be used in combination with conventional aluminide coatings and MCrAlY coatings to provide enhanced hot corrosion protection on shank/underplatform areas of turbine blades.

While it has been shown and described what is considered to be certain embodiments of the invention, it will, of course, be understood that various modifications and changes in form or detail can readily be made without departing from the spirit and scope of the invention. It is, therefore, intended that this invention not be limited to the exact form and detail herein shown and described, nor to anything less than the whole of the invention herein disclosed and hereinafter claimed.

The invention claimed is:

1. An aqueous slurry composition for the production of a multilayer coating system for hot corrosion protection of a substrate comprising:
   a basecoat slurry, comprising:
      a first binder comprising a first silicate-based aqueous solution, wherein said first binder is substantially free of chromate, phosphate, sodium, and potassium; and
      metal oxide particles incorporated into said first binder, said metal oxide particles comprising at least one of alumina, chromia, zirconia, zirconia-containing complex oxides, ceria and rare earth oxides;
      metallic particles incorporated into said first binder, said metallic particles comprising MCr or MCrAlY, where M is Ni or Co, or a combination of Ni and Co;
   a topcoat slurry, comprising:
      a second binder comprising a second silicate-based aqueous solution, wherein said second binder is substantially free of chromate, phosphate, sodium, and potassium, and further wherein the second silicate-based aqueous solution is devoid of the metal oxide particles and the metallic particles.

2. The aqueous slurry composition of claim 1, wherein the first silicate-based aqueous solution and the second silicate-based aqueous solution has a pH ranging from about 9 to about 13.

3. The aqueous slurry composition of claim 1, wherein the first silicate-based aqueous solution and the second silicate-based aqueous solution exclude silicone-containing materials and amorphous silica-containing materials.

4. The aqueous slurry composition of claim 1, wherein the first silicate-based aqueous solution comprises lithium silicate.

5. The aqueous slurry composition of claim 1, wherein the metallic particles comprise a particle size distribution characterized in with a 50th percentile of the particle size distribution has a diameter of between about 5 microns to about 8 microns and a 90th percentile of the particle size distribution has a diameter of less than about 12 microns to about 16 microns.

6. The aqueous slurry composition of claim 1, wherein the metal oxide particles comprise a particle size distribution characterized with a 50th percentile of the particle size distribution has a diameter of between about 0.4 microns to about 4 microns and a 90th percentile of the particle size distribution has a diameter of less than about 6 microns to about 8 microns.

7. A multilayer coating system for hot corrosion protection of a substrate, comprising:
   a substrate;
   a basecoat, said basecoat comprising:
      a first ceramic matrix characterized as comprising a first silicate-based matrix, wherein said first silicate-based matrix is substantially free of chromate, phosphate, sodium, and potassium;
      metal oxide particles incorporated into said first ceramic matrix, said metal oxide particles comprising at least one of alumina, chromia, zirconia, zirconia-containing complex oxides, ceria and rare earth oxides;
      metallic particles incorporated into said first ceramic matrix, said metallic particles comprising MCr or MCrAlY, where M is Ni or Co, or a combination of Ni and Co;
   a topcoat, said topcoat comprising:
      a second ceramic matrix characterized as comprising a second silicate-based matrix, wherein said second silicate-based matrix is substantially free of chromate, phosphate, sodium, and potassium, and further wherein the second silicate-based matrix is devoid of the metal oxide particles and the metallic particles.

8. The multilayer coating system of claim 7, wherein said first and second silicate-based matrix is thermally stable up to about 1600° F., and further said first and second silicate-based matrix is chemically resistant to molten sulfate induced type II hot corrosion.

9. The multilayer coating system of claim 7, wherein each of said first silicate-based matrix and said second silicate-based matrix is lithium silicate.

10. The multilayer coating system of claim 7, wherein the metallic particles comprise a particle size distribution characterized in that a 50th percentile of the particle size distribution has a diameter of between about 5 to about 8 microns and a 90th percentile of the particle size distribution has a diameter of less than about 12 microns to about 16 microns.

11. The multilayer coating system of claim 7, wherein the metal oxide particles comprise a particle size distribution characterized in that a 50th percentile of the particle size distribution has a diameter of between about 0.4 microns to about 4 microns and a 90th percentile of the particle size distribution has a diameter of less than about 6 microns to about 8 microns.

12. The multilayer coating system of claim 7, wherein the substrate is a superalloy substrate.

13. The multilayer coating system of claim 7, said multilayer coating system further exhibiting an absence of interdiffusion with the substrate.

14. The multilayer coating system of claim 7, wherein the substrate is a disk alloy.

* * * * *